United States Patent [19]

Acomb

[11] 3,841,353

[45] Oct. 15, 1974

[54] ANTI-SURGE OXYGEN CYLINDER VALVE

[75] Inventor: Byron Hillen Acomb, Florence, S.C.

[73] Assignee: Union Carbide Corporation, New York, N.Y.

[22] Filed: June 19, 1973

[21] Appl. No.: 371,518

[52] U.S. Cl. .............................................. 137/630
[51] Int. Cl. ............................................. F16k 1/30
[58] Field of Search................ 137/629, 630, 630.13

[56] References Cited
UNITED STATES PATENTS

| | | | |
|---|---|---|---|
| 2,740,418 | 4/1956 | Pankratz | 137/630 X |
| 2,864,400 | 12/1958 | Wiegel | 137/630 UX |
| 3,631,893 | 1/1972 | Seaman | 137/630 |

*Primary Examiner*—Robert G. Nilson
*Attorney, Agent, or Firm*—Dominic J. Terminello

[57] ABSTRACT

A cylinder valve is provided which slowly builds up oxygen pressure from an oxygen cylinder to an oxygen regulator thereby eliminating surges of oxygen to the regulator. The valve features a plunger slideably engaged in a bore located in the valve stem. Bleed means are provided through the plunger and valve stem arrangement to provide for the gradual increase in pressure in the valve chamber and thus to the oxygen regulator.

3 Claims, 5 Drawing Figures

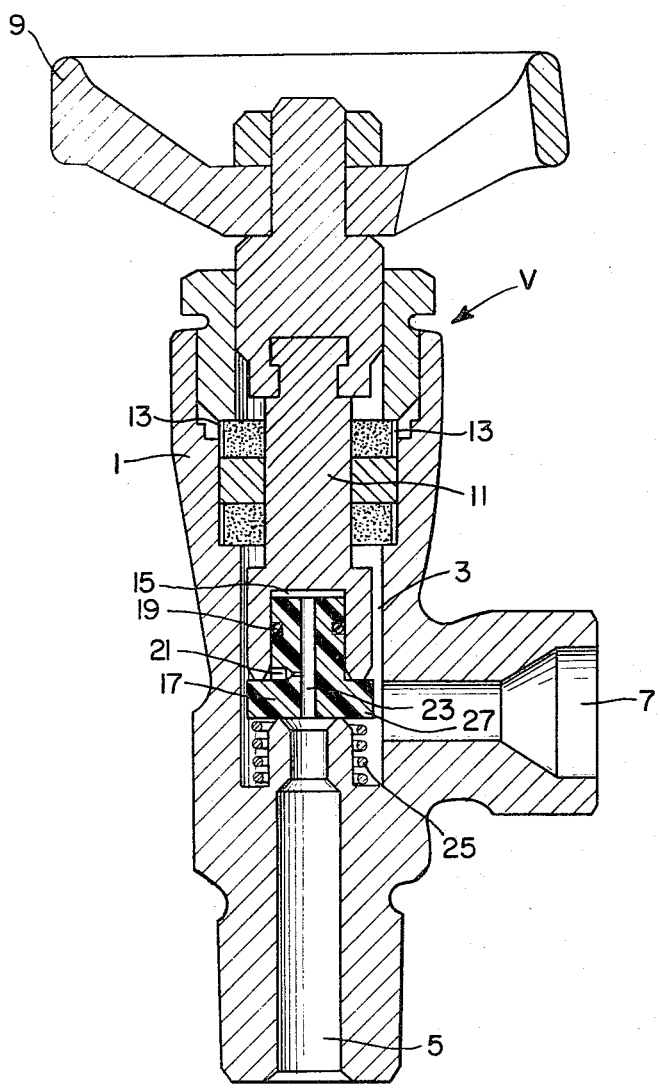

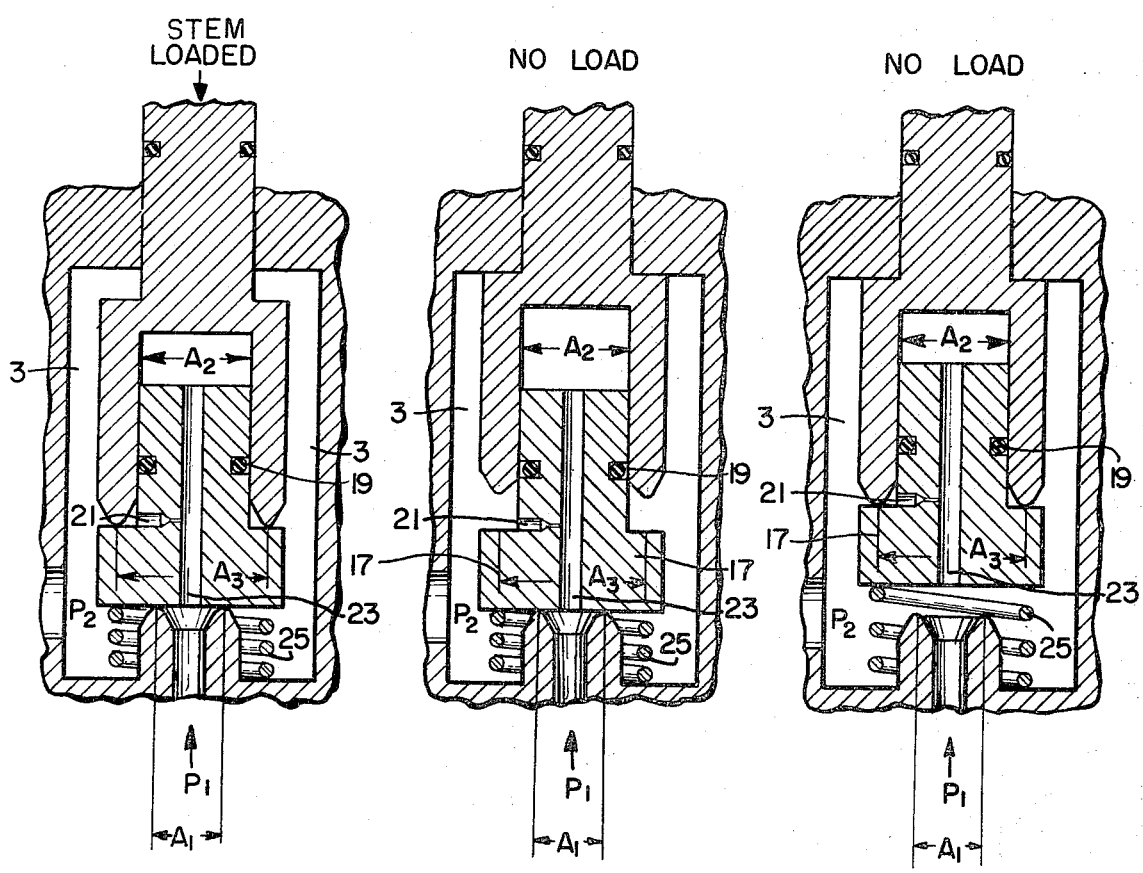

ANTI-SURGE OXYGEN CYLINDER VALVE

This invention relates to method and apparatus for substantially reducing surge of oxygen pressure when an oxygen cylinder valve is opened. More particularly, this invention relates to apparatus which permits oxygen pressure to slowly and safely reach a predetermined level at the oxygen regulator.

Oxygen regulator fires have long been a problem in the gas industry. A study of the case histories of regulator burnouts shows that in almost every case the damage occurred just after the valve was opened on a full or nearly full oxygen cylinder. The reason for the burnouts is not known for sure. It is theorized that the cause of the regulator fires may be due to heating of the oxygen against seating surfaces due to the rapid recompression of oxygen in the regulator inlet chamber. Investigations show that there is a rapid surge of high pressure oxygen into the oxygen regulator immediately preceding virtually every regulator burnout. Most burnouts occur in the hot summer months when both gas temperature and pressure in cylinders are higher. It is true that heat build-up increases as pressure and temperature increases. Based on this theory, it is concluded that reducing the rate of pressure build-up against seating surfaces of regulators will reduce the frequency of regulator fires.

Accordingly, it is a main object to provide method and apparatus for reducing oxygen surges when an oxygen cylinder valve is opened to thereby reduce the incidence of oxygen regulator fires.

A further object is to provide an anti-surge oxygen cylinder valve which will provide slow build-up of pressure to a predetermined level to an oxygen regulator before opening fully.

A further object is to provide such a valve which is simple and economical.

These and other objects will either become apparent or will be pointed out in referring to the following descriptions and drawings wherein:

FIG. 1 is a first elevation view partial in cross-section showing a typical apparatus for carrying out the invention;

FIG. 2 is a view of a preferred plunger element for the apparatus shown in FIG. 1; and FIGS. 3A, 3B and 3C are schematic drawings illustrating the operation of an apparatus incorporating the concept of the invention.

Referring to the drawings and in particular FIG. 1, the valve is shown generally at V, and has a housing 1. In housing 1 is a chamber 3. Inlet passage 5 leads to chamber 3 and outlet passage 7 communicates chamber 3 with the atmosphere or the regulator inlet. The valve V has a valve handle 9 and a valve stem 11 extending through the bore 13 in housing 1. The valve stem 11 terminates in a bore 15. A plunger member 17 fits in sliding contact in the bore 15. In this embodiment the plunger 17 has an O-ring 19 fitted thereon to prevent gas leakage between the plunger 17 and the walls of bore 15 in stem 11. A bleeder hole 21 is provided in the plunger 17 communicating with a longitudinal center passage 23 in the plunger 17. The plunger 17 is typically made from some material such as nylon. A spring 23 is mounted in the chamber 3 and rests between the wall of housing 1 and flange 27 on plunger 17. The spring force urges the plunger away from the inlet passage 5. The various parts of the valve may be dimensioned to cause a lifting of plunger 17 at any desired pressure differential after stem 11 has been raised. In typical apparatus (see FIG. 3A), $A_1$ may be ⅜ in. dia.; $A_2$ ½ in. dia., and the spring load 40 pounds. In this case for any $P_1$ pressure, the plunger will not lift until $P_2$ rises to within 500 psi of $P_1$. Changing the spring load and/or $A_1$ and/or $A_2$ will provide any differential desired.

In FIG. 2 is shown a preferred embodiment of the plunger 17. In this embodiment the plunger 17' is made primarily of brass or bronze with molded nylon seating surfaces 18. The tolerance between the outside diameter (OD) of the plunger and the inside diameter (ID) of the valve stem bore can be small enough such that flow through the clearance effectively acts as the bleeder eliminating the need for bleeder hole 21 and the O-rings 19.

In operation when the valve stem is loaded, the valve is closed and the $P_1$ gas pressure is effectively sealed at $A_1$ and $A_3$ (see FIG. 3A) and the $P_1$ gas pressure is effective over area $A_3$. When the valve stem is lifted (FIG. 3B), the plunger 17 remains in the closed position against seat $A_1$ because the $P_1$ pressure over area $A_2$ is greater than the $P_1$ pressure over area $A_1$ plus the spring-25 force. At this time the gas at pressure $P_1$ passes through the bleeder orifice 21 and slowly pressurizes chamber 3 and downstream to the closed regulator seat. The rate at which chamber 3 is pressurized is largely dependent upon the size of bleeder 21 and pressure $P_1$. When chamber 3 is pressurized to some predetermined pressure $P_2$, the force of $P_1$ over area $A_1$ plus the force of the spring 25, plus the force of $P_2$ over the area $A_2$ less $A_1$, becomes greater than the force of $P_1$ over area $A_2$ and the plunger rises as shown in FIG. 3C, thus opening the valve to full flow. The pressure rise time and the pressure in chamber 3 at full opening can be varied as desired by selection of sizes for $A_1$ and $A_2$, the bleeder (21) size and the spring (25) force.

If, after once opened as in 3C, the valve is physically closed by loading the stem as in FIG. 3A, and if the pressure $P_2$ is not reduced, then the valve can be reopened to FIG. 3C without going through the anti-surge step 3B. Since the pressure $P_2$ was not reduced, then there will be no surge upon reopening.

If, however, after once opened as in 3C, the valve is physically closed as in 3A and the pressure $P_2$ is reduced to below a predetermined level, then reopening the valve again repeats step 3B. This is to eliminate the surge due to a large difference between pressures $P_1$ and $P_2$.

Having described the invention with reference to certain preferred embodiments it should be understood that modifications may be made to the parts or the arrangement thereof relative to one another without departing from the spirit and scope of the invention. For example, an anti-surge unit could be incorporated as a separate unit downstream of a cylinder valve.

I claim:

1. An anti-surge oxygen cylinder valve comprising a housing having a chamber with an inlet passage and an outlet passage; a valve stem extending through a bore in said housing and into said chamber, and having a bore in the end thereof; a plunger member in sliding engagement with said bore in the end of said valve stem, said plunger having a center passage through the length thereof, said valve stem and plunger arrangement adapted to seal off said inlet passage when the valve is in the closed position; resilient means mounted in said chamber between said housing and said plunger and urging said plunger away from said inlet; and means for bleeding gas pressure from said inlet passage through said valve stem and plunger arrangement for slowly building the pressure in said chamber.

2. Apparatus according to claim 1 wherein said valve stem plunger, resilient means, and inlet passage are dimensioned so that the plunger will not lift off said inlet passage until there is a predetermined pressure differential between the inlet pressure and outlet pressure.

3. Apparatus according to claim 1 wherein said valve stem plunger resilient means and inlet passage are dimensioned so that the plunger will not lift off said inlet passage until the pressure in the outlet passage is within 500 psi of the pressure in the inlet passage.

* * * * *